United States Patent
Toyofuku (10) Patent No.: US 9,230,178 B2
(45) Date of Patent: Jan. 5, 2016

(54) VISION SUPPORT APPARATUS FOR VEHICLE

(75) Inventor: Kunihiko Toyofuku, Toyota (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 214 days.

(21) Appl. No.: 14/118,770

(22) PCT Filed: Jun. 2, 2011

(86) PCT No.: PCT/JP2011/062724
§ 371 (c)(1),
(2), (4) Date: Nov. 19, 2013

(87) PCT Pub. No.: WO2012/164729
PCT Pub. Date: Dec. 6, 2012

(65) Prior Publication Data
US 2014/0085476 A1    Mar. 27, 2014

(51) Int. Cl.
*G06K 9/00*    (2006.01)
*B60Q 1/08*    (2006.01)
*G08G 1/16*    (2006.01)
*B60R 1/00*    (2006.01)

(52) U.S. Cl.
CPC ............ *G06K 9/00805* (2013.01); *B60Q 1/085* (2013.01); *B60R 1/00* (2013.01); *G08G 1/166* (2013.01); *B60Q 2300/112* (2013.01); *B60Q 2300/45* (2013.01); *B60R 2300/307* (2013.01)

(58) Field of Classification Search
CPC ............ B60Q 1/085; B60Q 2300/112; B60Q 2300/45; B60R 1/00; B60R 2300/307; G06K 9/00805; G08G 1/166
USPC .......................................................... 348/148
See application file for complete search history.

(56) References Cited

U.S. PATENT DOCUMENTS

| 7,188,014 | B1 | 3/2007 | Liao et al. |
| 7,791,458 | B2 * | 9/2010 | Shimaoka .............. B60Q 1/085 340/435 |
| 2008/0225271 | A1 | 9/2008 | Ohmura |
| 2010/0235040 | A1 * | 9/2010 | Iwai ...................... B60Q 1/085 701/31.4 |
| 2011/0068910 | A1 | 3/2011 | Iwai et al. |

FOREIGN PATENT DOCUMENTS

| CN | 101842261 A | 9/2010 |
| JP | 2005-47455 A | 2/2005 |
| JP | 2005-135037 A | 5/2005 |

(Continued)

*Primary Examiner* — Mohammed Rahaman
(74) *Attorney, Agent, or Firm* — Sughrue Mion, PLLC (57) ABSTRACT

A vision support apparatus of the invention includes a first obstacle detecting part configured to detect an obstacle near a vehicle with a visible light image; a second obstacle detecting part configured to detect the obstacle using an infrared light image, a detection status determining part configured to determine whether it is difficult or impossible for the first obstacle detecting part to detect the obstacle; and an obstacle information providing part configured to provide a driver of the vehicle with information about the obstacle detected by the second obstacle detecting part, if it is determined by the detection status determining part that it is difficult or impossible for the first obstacle detecting part to detect the obstacle, thereby informing the driver of the existence of the obstacle when it is difficult for the driver to visually perceive the obstacle because of insufficient reflection of the visible light from the obstacle.

7 Claims, 5 Drawing Sheets

(56) References Cited

FOREIGN PATENT DOCUMENTS

| | | |
|---|---|---|
| JP | 2006-338594 A | 12/2006 |
| JP | 2007-45336 A | 2/2007 |
| JP | 2007-76378 A | 3/2007 |
| JP | 2007-261312 A | 10/2007 |
| JP | 2007-263704 A | 10/2007 |
| JP | 2008-143510 A | 6/2008 |
| JP | 2008-226140 A | 9/2008 |
| JP | 2008-230333 A | 10/2008 |
| JP | 2010-18165 A | 1/2010 |
| JP | 2010-95205 A | 4/2010 |
| JP | 2010-212156 A | 9/2010 |
| JP | 2011-87006 A | 4/2011 |

* cited by examiner

VISION SUPPORT APPARATUS FOR VEHICLE

CROSS REFERENCE TO RELATED APPLICATIONS

This application is a National Stage of International Application No. PCT/JP2011/062724, filed on Jun. 2, 2011, the contents of all of which are incorporated herein by reference in their entirety.

TECHNICAL FIELD

The present invention is related to a vision support apparatus for a vehicle. In particular, the present invention is related to a vision support apparatus for a vehicle suited for providing information about an obstacle near a vehicle which is detected by a means other than a visible light image when it is difficult or impossible to detect the obstacle with a visible light image.

BACKGROUND ART

A vision support apparatus for a vehicle which detects an obstacle near a vehicle with an infrared light image captured by an infrared camera is known (see Patent Document 1, for example). According to the known vision support apparatus for a vehicle, if the obstacle is detected with the infrared light image, an illumination direction of a front lighting device which illuminates visible light is changed such that a direction in which the obstacle exists is included therein. Thus, according to the known vision support apparatus for a vehicle, even when the obstacle which is not illuminated by the visible light from the front lighting device at first exists at night, in particular, changing the illumination direction of the visible light from the front lighting device makes it easier for a driver of the vehicle to visually perceive the obstacle, if the obstacle is detected with the infrared light image.

[Patent Document 1] Japanese Laid-open Patent Publication No. 2007-076378

DISCLOSURE OF INVENTION

Problem to be Solved by Invention

However, even if the illumination direction of the visible light is changed to the direction of the obstacle detected with the infrared light image as disclosed in Patent Document 1, there may be a case where the reflection of the visible light from the obstacle is not sufficient because of a fact that the obstacle has a dark appearance such as a pedestrian wearing black clothes, for example. In such a case, it is still difficult for the driver to visually perceive the obstacle. For this reason, according to the configuration disclosed in Patent Document 1, it cannot be said that sufficient enough vision support is performed for the driver to inform the driver of the existence of the obstacle.

The present invention is made in consideration of the matters described above, and an object of the present invention is to provide a vision support apparatus for a vehicle which can inform a driver of existence of an obstacle even when it is difficult for the driver to visually perceive the obstacle due to insufficient reflection of visible light from the object.

Means to Solve the Problem

The object is archived by a vision support apparatus for a vehicle which includes a first obstacle detecting part configured to detect an obstacle near a vehicle with a visible light image; a second obstacle detecting part configured to detect the obstacle by a means other than the visible light image; a detection status determining part configured to determine whether it is difficult or impossible for the first obstacle detecting part to detect the obstacle; and an obstacle information providing part configured to provide a driver of the vehicle with information about the obstacle detected by the second obstacle detecting part, if it is determined by the detection status determining part that it is difficult or impossible for the first obstacle detecting part to detect the obstacle.

Advantage of the Invention

According to the present invention, it becomes possible to inform a driver of existence of an obstacle even when it is difficult for the driver to visually perceive the obstacle due to insufficient reflection of visible light from the object.

DESCRIPTION OF REFERENCE SYMBOLS

10 vision support apparatus for a vehicle
12 infrared camera
14 visible light camera
16 electronic control unit (ECU)
18 display device
20 front lighting device
22 adaptive front-lighting system

BEST MODE FOR CARRYING OUT THE INVENTION

In the following, concrete embodiments of a vision support apparatus for a vehicle according to the present invention will be described in detail by referring to the accompanying drawings.

Figure 1:
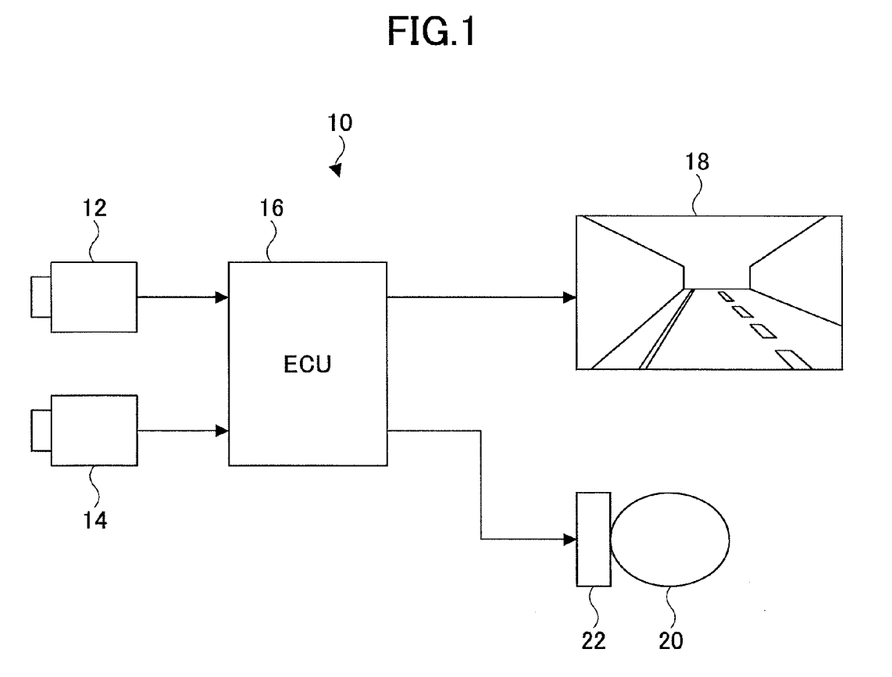
FIG. 1 is a diagram for illustrating a configuration of a vision support apparatus for a vehicle according an embodiment of the present invention.

FIG. 1 is a diagram for illustrating a configuration of a vision support apparatus 10 for a vehicle according to an embodiment of the present invention. The vision support apparatus 10 according to the embodiment performs vision support to inform a driver of a host vehicle of information about a status of a region around the host vehicle (a region in front of the host vehicle, in particular) at night or in a tunnel where the surrounding scenery is dark, in particular.

The vision support apparatus 10 includes an infrared camera 12. The infrared camera 12 is provided in a grill portion of a vehicle front portion or on a rear view mirror stay in a cabin, or the like. The infrared camera 12 is capable of capturing a scene in a predetermined region in front of the vehicle with light of a wave-length region which is invisible to human eyes such as near infrared ray. The predetermined region related to the infrared camera 12 includes a traveling lane, a side road or a pedestrian walk way next to the traveling lane in front of the vehicle, etc.

The vision support apparatus 10 includes a visible light camera 14. The visible light camera 14 is provided in a grill portion of a vehicle front portion or on a rear view mirror stay in a cabin, or the like. The visible light camera 14 is capable of capturing a scene in a predetermined region in front of the vehicle with light of a wave-length region which is visible to human eyes. The predetermined region related to the visible light camera 14 includes a traveling lane, a side road or a pedestrian walk way next to the traveling lane in front of the vehicle, etc. It is noted that the visible light camera 14 and the infrared camera 12 may be arranged side by side at substantially the same location. Further, the visible light camera 14 and the infrared camera 12 may capture the images in substantially the same direction from the vehicle.

The visible light camera 14 and the infrared camera 12 are connected to an electronic control unit (referred to as an "ECU", hereinafter) 16 which mainly includes a microcomputer. The infrared camera 12 supplies the captured image of the scene in front of the vehicle to the ECU 16. The visible light camera 14 supplies the captured image of the scene in front of the vehicle to the ECU 16. The image captured by the infrared camera and the image captured by the visible light camera 14 include data at a plurality of pixels which includes coordinate data and thermal data.

The ECU 16 performs a predetermined process such as a feature extracting process, a pattern recognition process, etc., to perform an image recognition process on the obtained image captured by the infrared camera 12. Further, the ECU 16 determines, based on the image recognition process result, whether in the captured image an obstacle (a pedestrian or a traveling bicycle, in particular), which may have an influence on the traveling of the host vehicle, exists on a road in front of the host vehicle. Further, the ECU 16 detects a position of the obstacle with respect to the host vehicle if it is determined that the obstacle exists.

The ECU 16 performs a predetermined process such as a feature extracting process, a pattern recognition process, etc., to perform an image recognition process on the obtained image captured by the visible light camera 14. Further, the ECU 16 determines, based on the image recognition process result, whether in the captured image an obstacle (a pedestrian or a traveling bicycle, in particular), which may have an influence on the traveling of the host vehicle, exists on a road in front of the host vehicle. Further, the ECU 16 detects a position of the obstacle with respect to the host vehicle if it is determined that the obstacle exists.

The ECU 16 is connected to a display device 18 which can be viewed by the driver of the vehicle. The display device 18 is provided in an upper portion of a center panel or an instrument panel in the cabin. The display device 18 may also be used to display a navigation screen. The ECU 16 is capable of displaying the captured image obtained from the infrared camera 12 on the display device 18. Further, if the ECU 16 determines, based on the captured image from the infrared camera 12, that the obstacle exists in front of the vehicle, the ECU 16 is capable of superimposing an image featuring the position of the obstacle onto the captured image displayed on the display device 18.

The superimposed (enhancement) image of the position of the obstacle to be displayed on the display device 18 includes an image of a frame which surrounds a portion of the captured image of the infrared camera 12 where the obstacle exists, an image of an arrow indicating that portion, etc. Further, when the superimposed image is the image of the frame or the arrow, the image of the frame or the arrow may be colored in a predetermined color (red, yellow, white, etc., for example). Further, when the superimposed image is the image of the frame, the inside of the frame may have a half-tone dot meshing pattern.

The vehicle on which the vision support apparatus 10 is installed includes a front lighting device 20 for illuminating the visible light toward the scene in front of the vehicle. The front lighting device 20 is a movable head lamp whose light distribution region of the visible light illuminated toward the scene in front of the vehicle is changed by an adaptive front-lighting system 22. For example, the adaptive front-lighting system 22 changes a light axis of the front lighting device 20 via a drive control of an electric motor which is mechanically connected to the front lighting device 20 or changes the illumination region via an on/off control of LEDs of the front lighting device 20 such that the illumination direction of the visible light from the front lighting device 20 is changed according to a steering angle of the vehicle, etc. The adaptive front-lighting system 22 is connected to the ECU 16, and changes the illumination direction of the visible light from the front lighting device 20 according to an instruction from the ECU 16.

Further, to the ECU 16 is supplied vehicle information including vehicle speed information, etc. The ECU 16 detects vehicle speed of the host vehicle, etc., based on the supplied vehicle information.

Figure 2:
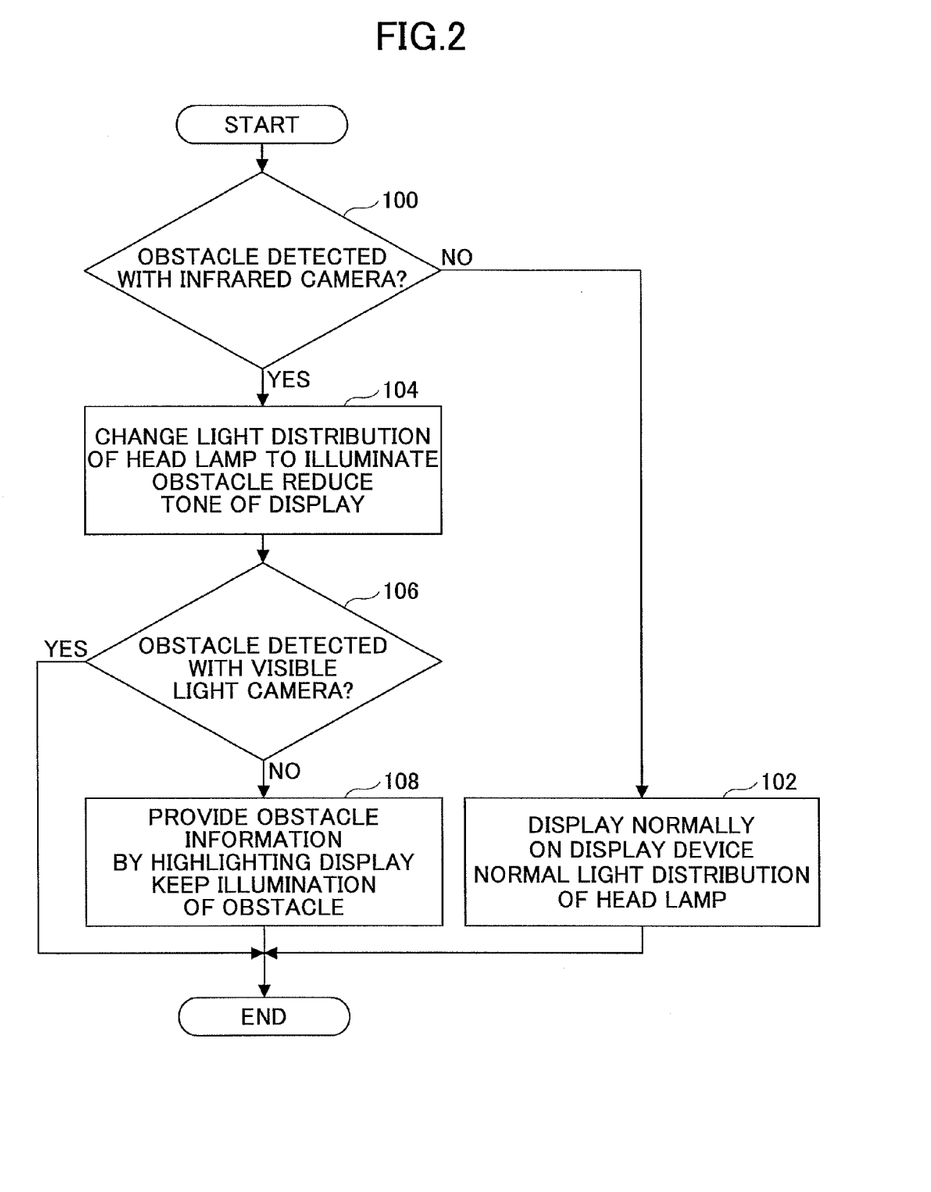
FIG. 2 is a flowchart for illustrating an example of a control routine executed by the vision support apparatus for a vehicle according the embodiment.
Figure 3A:
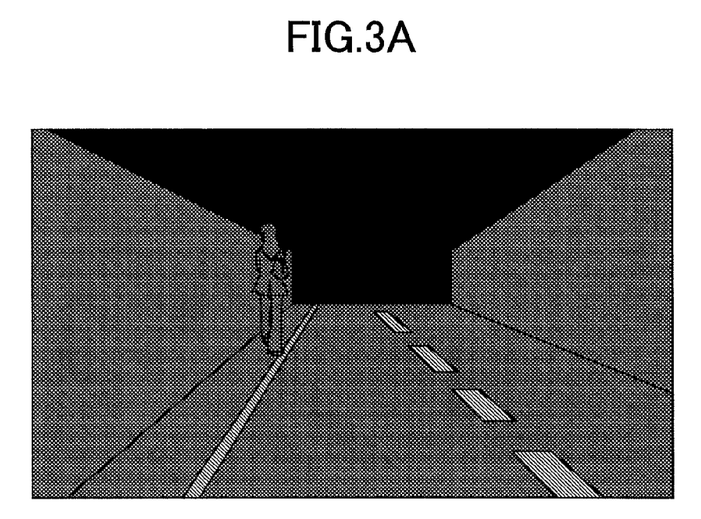
FIG. 3A is a diagram for illustrating a camera image captured by a visible light camera under a situation where a scene in front of a host vehicle is relatively dark.
Figure 3B:
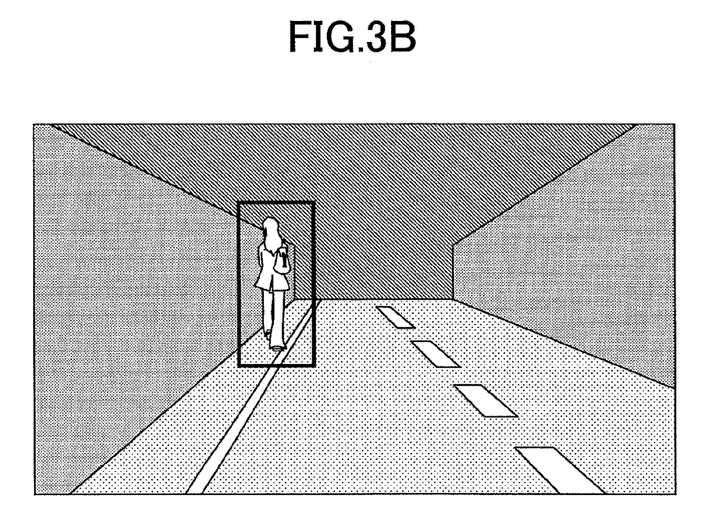
FIG. 3B is a diagram for illustrating a camera image captured by an infrared camera under the same situation as disclosed in FIG. 3A.
Figure 4A:
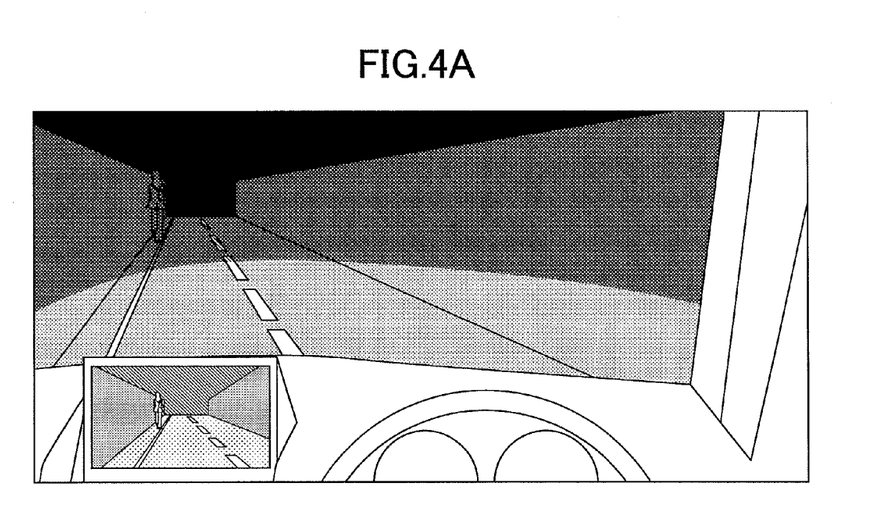
FIG. 4A is a diagram for illustrating a scene in front of a vehicle and a displayed image on a display device when illumination is implemented by a front lighting device for a predetermined region in front of the vehicle.
Figure 4B:
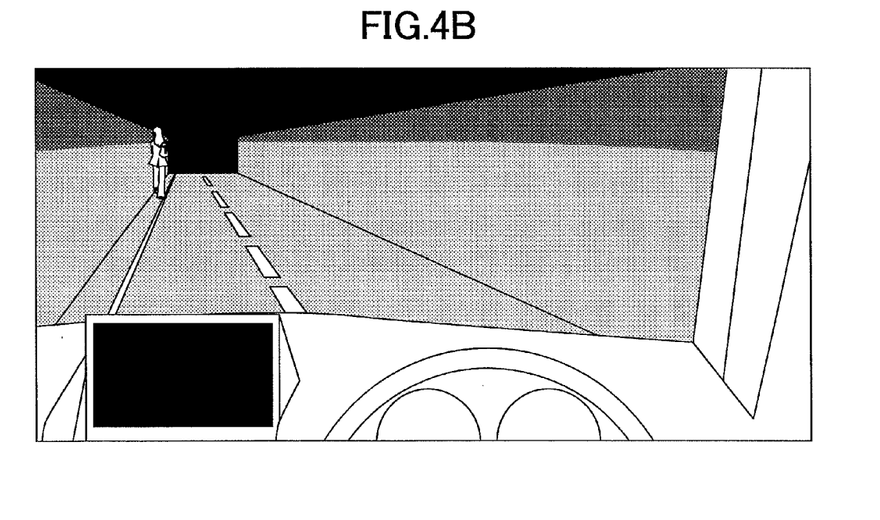
FIG. 4B is a diagram for illustrating a scene in front of a vehicle and a displayed image on a display device when illumination is implemented by a front lighting device for a region including the detected obstacle.
Figure 4C:
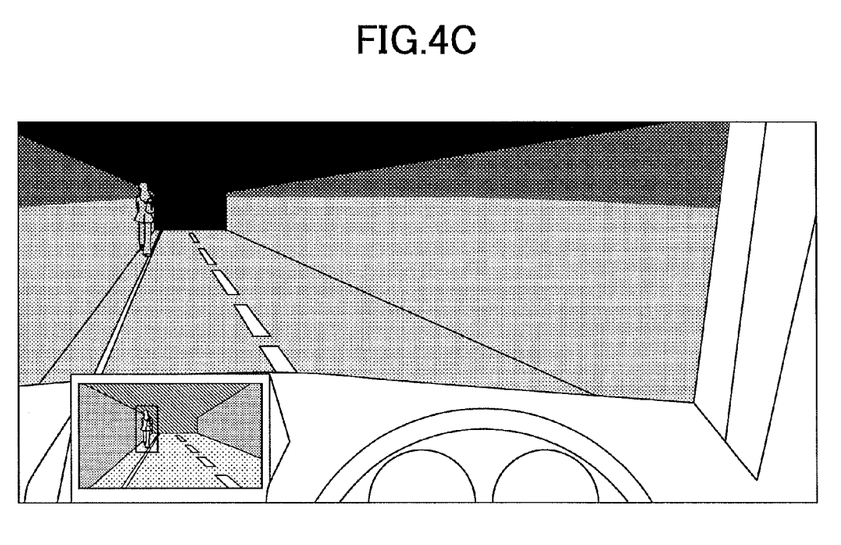
FIG. 4C is a diagram for illustrating a scene in front of a vehicle and a displayed image on a display device when illumination is implemented by a front lighting device for a region including the detected obstacle but the existence of the obstacle is not detected with the camera image by the visible light camera.

Next, with reference to FIGS. 2 through 4, operations of the vision support apparatus 10 according to the embodiment are described.

FIG. 2 is a flowchart for illustrating an example of a control routine executed by the ECU 16 of the vision support apparatus 10 according the embodiment. FIG. 3A is a diagram for illustrating a camera image captured by the visible light camera 14 in a situation where a scene in front of a host vehicle is relatively dark. FIG. 3B is a diagram for illustrating a camera image captured by the infrared camera 12 under the same situation as disclosed in FIG. 3A. It is noted that, in FIG. 3B, the captured image including the superimposed image which features the position of the pedestrian is illustrated. Further, FIG. 4A is a diagram for illustrating a scene in front of the vehicle and a displayed image on the display device 18 when light distribution by the front lighting device 20 is implemented for a predetermined region (i.e., a nominal region for a case where the obstacle is not detected) in front of the vehicle. FIG. 4B is a diagram for illustrating a scene in front of a vehicle and a displayed image on the display device 18 when light distribution by the front lighting device 20 is implemented for a region including the detected obstacle. FIG. 4C is a diagram for illustrating a scene in front of a vehicle and a displayed image on the display device 18 when light distribution by the front lighting device 20 is implemented for a region including the detected obstacle but the existence of the obstacle is not detected with the image captured by the visible light camera 14.

In the embodiment, the vision support apparatus 10 is initiated to start vision support for the driver of the host vehicle when it is detected that a scene around the host vehicle is dark or a start switch is turned on by the driver of the host vehicle under a situation where an ignition switch is in its ON state, for example. It is noted that the initiation of the vision support apparatus 10 may require such a condition to be met that the front lighting device 20 of the host vehicle illuminates the visible light in response to an ON operation of a manual switch or illuminates the visible light automatically when an illumination condition is met.

After the initiation, the ECU 16 instructs the infrared camera 12 to capture the image. Then, the ECU 16 obtains the camera image supplied from the infrared camera 12 and displays the camera image on the display device 18. When the camera image from the infrared camera 12 is displayed on the display device 18, the driver of the host vehicle can understand a situation around the vehicle, which cannot be seen by his/her own eyes but can be seen with the infrared ray, by viewing the display device 18.

Further, the ECU 16 executes the following process at a predetermined cycle. Specifically, at first, the ECU 16 processes the camera image obtained from the infrared camera 12 to determine whether an obstacle is detected on the road, which is included in the camera image, in front of the host vehicle (step S100).

If the ECU 16 determines that the an obstacle is not detected on the road, which is included in the camera image, in front of the host vehicle (No in step S100), the ECU 16 displays the camera image obtained from the infrared camera 12 on the display device 18, and sets the light distribution region of the visible light by the front lighting device 20 such that it corresponds to a predetermined region in front of the vehicle (i.e., a nominal region in the case where an obstacle is not detected) (step S102).

On the other hand, if the ECU 16 determines that the an obstacle is detected on the road, which is included in the camera image, in front of the host vehicle (Yes in step S100), the ECU 16 instructs the adaptive front-lighting system to perform control such that the illumination direction of the visible light from the front lighting device 20 is directed to the obstacle on the road or the obstacle on the road is included within the illumination region of the visible light of the front lighting device 20. When such an instruction is issued, the adaptive front-lighting system 22 changes the illumination direction of the visible light from the front lighting device 20 such that the obstacle on the road is included therein. When the illumination direction of the visible light from the front lighting device 20 is thus changed, normally, it becomes easier for the driver of the host vehicle to visibly perceive the obstacle on the road with direct vision, because the obstacle on the road which is detected based on the camera image of the infrared camera 12 is illuminated by the visible light.

Further, if the ECU 16 determines that the an obstacle is detected on the road, which is included in the camera image, in front of the host vehicle (Yes in step S100), the ECU 16 changes the illumination direction of the visible light from the front lighting device 20 as described above and reduces the tone of the camera image from the infrared camera 12 displayed on the display device 18. It is noted that the tone reduction may be implemented by reducing the brightness of the image on the display device 18 below a normal brightness or by not displaying the camera image from the infrared camera 12. When such a tone reduction is performed on the display device 18, it becomes more difficult for the driver of the host vehicle to visibly perceive the camera image from the infrared camera 12 itself. As a result of this, the driver of the host vehicle is encouraged to directly see the road on which the obstacle exists.

Thus, according to the present embodiment, when it is detected based on the camera image from the infrared camera 12 that there is an obstacle on the road, the illumination direction of the visible light from the front lighting device 20 is changed with the adaptive front-lighting system 22, and the tone of the camera image from the infrared camera 12 displayed on the display device 18 is reduced. With this arrangement, it becomes possible to encourage the driver of the host vehicle to directly see the road, thereby enabling the driver of the host vehicle to visibly perceive the obstacle on the road more easily.

Further, after having changed the illumination direction of the visible light from the front lighting device 20 with the adaptive front-lighting system 22, the ECU 16 processes the camera image obtained from the visible light camera 14 to determine whether the obstacle is detected on the road, which is included in the camera image, in front of the host vehicle (step S106).

When the obstacle, such as the pedestrian wearing black clothes at which the visible light hardly reflect, for example, is not detected by the image recognition process on the camera image from the visible light camera 14 even though the obstacle for the host vehicle actually exists, it can be determined that the detection of the obstacle with the camera image from the visible light camera 14 is difficult or impossible because the obstacle itself or the scene around the obstacle is dark and the reflection of the visible light on the obstacle is not sufficient (see FIG. 3A). In this case, it can be determined that it is also difficult or impossible for the driver of the host vehicle to visibly perceive the obstacle on the road with direct vision.

Thus, when the obstacle on the road is detected with the image recognition process on the camera image from the infrared camera 12 but the obstacle on the road is not detected with the image recognition process on the camera image from the visible light camera 14, it is appropriate to change the tone of the display on the display device 18 from the tone reduced status to a status (tone down canceled status) in which the driver can visibly perceive the camera image from the infrared camera so that the driver of the host vehicle can see the camera image from the infrared camera 12 via the display device 18.

If the ECU 16 determines that the obstacle on the road in front of the host vehicle included in the camera image from the visible light camera 14 is detected (Yes in step S106), the process routine ends without performing any further processing.

On the other hand, if the ECU 16 determines that the obstacle on the road in front of the host vehicle included in the camera image from the visible light camera 14 is not detected (No in step S106), the ECU 16 holds the illumination of the visible light from the front lighting device 20 with the adaptive front-lighting system 22 such that the illumination region thereof includes the obstacle detected based on the camera image from the infrared camera 12; changes the tone of the display on the display device 18 from the tone reduced status to the tone down canceled status in which the driver can visibly perceive the camera image from the infrared camera 12; and implements the superimposed image for featuring the position of the obstacle in the camera image from the infrared camera 12 displayed on the display device 18.

When the tone reduced status is canceled on the display device 18, the driver of the host vehicle can see the camera image from the infrared camera 12 itself via the display device 18, and recognize the obstacle on the road via the camera image from the infrared camera 12 displayed on the display device 18. In this case, the driver of the host vehicle can recognize the obstacle on the road more easily if he/she views the screen of the display device 18 instead of directly seeing the road. Further, when the superimposed image for featuring the position of the obstacle in the camera image from the infrared camera 12 displayed on the display device 18 is implemented, the driver of the host vehicle can recognize the existence of the obstacle on the road itself and the position thereof more easily via the image by viewing the screen of the display device 18.

Thus, according to the present embodiment, when the obstacle on the road is detected based on the camera image from the infrared camera 12 but the obstacle on the road is not detected based on the camera image from the visible light camera 14, the camera image from the infrared camera 12 is displayed on the display device 18 and the image for featuring the position of the obstacle is superimposed, which enables the driver of the host vehicle to recognize the obstacle on the road via the display device 18 more easily.

In this way, according to the vision support apparatus 10 of the present embodiment, when the obstacle on the road is detected based on the camera image from the infrared camera 12, whether the camera image from the infrared camera 1 is displayed on the display device 18 in a visibly perceivable manner for the driver or not is changed according to whether the obstacle on the road is detected based on the camera image from the visible light camera 14. In other words, the camera image from the infrared camera 12 is displayed on the display device 18 in a visibly perceivable manner for the driver, if the obstacle on the road is not detected based on the camera image from the visible light camera 14, while the camera image from the infrared camera 12 is not displayed on the display device 18 in a visibly perceivable manner for the driver, if the obstacle on the road is detected based on the camera image from the visible light camera 14.

In this connection, according to the present embodiment, if the obstacle on the road is not detected based on the camera image from the visible light camera 14, the timing of providing the driver of the host vehicle with the camera image from the infrared camera 12 via the display device 18 is limited to the case where the obstacle on the road is not detected based on the camera image from the visible light camera 14. Thus, according to the present embodiment, because the timing at which the driver of the host vehicle should carefully see the camera image from the infrared camera 12 via the display device 18 is limited to a timing at which it is determined that the obstacle on the road cannot be visibly perceived with direct vision, it is possible to provide information on the presence or absence of the obstacle on the road such that the driver can understand the information more easily and inform the driver of the obstacle more immediately if the obstacle exists in front of the host vehicle during traveling of the host vehicle, in comparison with a configuration in which providing the camera image from the infrared camera 12 via the display device 18 is performed regardless of whether the obstacle on the road is detected based on the camera image from the visible light camera 14.

Further, according to the present embodiment, the camera image from the infrared camera 12 is provided to the driver of the host vehicle via the display device 18 under a situation in which the illumination direction of the visible light from the front lighting device 20 has been changed with the adaptive front-lighting system 22 such that the obstacle on the road is included the illumination region thereof. When the illumination direction of the visible light from the front lighting device 20 is thus changed with the adaptive front-lighting system 22, normally, it becomes possible for the driver of the host vehicle to visibly perceive the obstacle on the road with direct vision, because the obstacle on the road which is detected based on the camera image of the infrared camera 12 is illuminated by the visible light from the front lighting device 20. However, when the obstacle is a pedestrian who wears black clothes on which the visible light is not substantially reflected, for example, there may be a case where the light is not effectively reflected toward the host vehicle even when obstacle is illuminated by the visible light from the front lighting device 20. In this case, the driver of the host vehicle may not visibly perceive the obstacle with direct vision.

In contrast, according to the present embodiment, as described above, the camera image from the infrared camera 12 is provided to the driver of the host vehicle via the display device 18 under a situation in which the illumination direction of the visible light from the front lighting device 20 has been changed with the adaptive front-lighting system 22 such that the obstacle on the road is included in the illumination region thereof. Thus, even if the driver of the host vehicle cannot visibly perceive the obstacle on the road with direct vision after the light distribution of the front lighting device 20 has been changed with the adaptive front-lighting system 22, he/she can recognize the obstacle on the road via the display device 18. Therefore, according to the present embodiment, it becomes possible to assure safe driving of the host vehicle.

For example, if the light distribution of the front lighting device 20 corresponds to the predetermined region in front of the host vehicle under a situation where the pedestrian exists on the road, there may be a case where the pedestrian is not illuminated by the visible light from the front lighting device 20. In this case, the driver of the host vehicle may not visibly perceive the pedestrian with direct vision (see FIG. 4A).

According to the present embodiment, under such a situation as described above, when the pedestrian on the road is detected based on the camera image from the infrared camera 12, the illumination direction of the visible light from the front lighting device 20 is changed with the adaptive front-lighting system 22 such that the pedestrian is included in the illumination region therein and the tone of the display of the camera image from the infrared camera 12 on the display device 18 is reduced (see FIG. 4B). When the illumination direction of the visible light from the front lighting device 20 is thus changed, normally, it becomes possible for the driver of the host vehicle to visibly perceive the pedestrian on the road with direct vision, because the pedestrian is illuminated by the visible light and the light reflected on the pedestrian comes back to the host vehicle. Further, when the tone of the camera image from the infrared camera 12 on the display device 18 is reduced, the driver of the host vehicle is encouraged to directly see the pedestrian on the road with direct vision, because it becomes impossible for the driver of the host vehicle to grasp the scene in front of the vehicle that is included in the camera image from the infrared camera 12.

On the other hand, when the pedestrian on the road wears clothes or the like at which the visible light hardly reflects, it becomes difficult for the driver of the host vehicle to visually perceive the pedestrian on the road with direct vision because the visible light from the front lighting device 20 does not reflect at the pedestrian.

According to the present embodiment, under such a situation as described above, when the pedestrian on the road is detected based on the camera image from the infrared camera 12 but the pedestrian on the road is not detected based on the camera image from the visible light camera 14, the tone of the display of the display device 18 is changed from the tone reduced status to the status (tone down canceled status) in which the driver can visibly perceive the camera image from the infrared camera 12, and the superimposed image for featuring the position of the pedestrian in the camera image from the infrared camera 12 displayed on the display device 18 is implemented (see FIG. 4C). In this case, the camera image from the infrared camera 12 is displayed on the display device 18 and the position of the pedestrian is superimposed to be featured, the driver of the host vehicle can recognize the pedestrian on the road via the display device 18.

In this way, according to the vision support apparatus 10 of the present embodiment, in order to have the driver of the host vehicle recognize the obstacle on the road with reliability, the timing at which the driver should carefully see the road with direct vision and the timing at which the driver should check the camera image from the infrared camera 12 via the display device 18 can be clearly separated, which improves the safety of the traveling vehicle.

It is noted that, in the embodiment described above, the camera image corresponds to "a means other than a visible light image" in claims, and a display device 18 corresponds to "a predetermined display device" in claims.

Further, "a first obstacle detecting part" in claims is implemented by the ECU 16 when the ECU 16 processes the camera image from the visible light camera 14 to detect an obstacle on the road in front of the host vehicle that could have influence on the traveling of the host vehicle. Further, "a second obstacle detecting part" in claims is implemented by the ECU 16 when the ECU 16 processes the camera image from the infrared camera 12 to detect an obstacle on the road in front of the host vehicle that could have influence on the traveling of the host vehicle. Further, "a detection status determining part" in claims is implemented by the ECU 16 when the ECU 16 executes the process of step S106 in FIG. 2. Further, "an obstacle information providing part" in claims is implemented by the ECU 16 when the ECU 16 changes the tone of the camera display from the infrared camera 12 on the display device 18 from the tone reduced status to the tone down canceled status in which the driver can visibly perceive the camera image from the infrared camera 12 and implements the superimposed image for featuring the position of the obstacle in the camera image from the infrared camera 12 displayed on the display device 18. Further, "a light direction changing part" in claims is implemented by the ECU 16 when the ECU 16 changes the illumination direction of the visible light from the front lighting device 20 with the adaptive front-lighting system 22 such that the obstacle on the road is included therein. Further, "an infrared light image controlling part" in claims is implemented by the ECU 16 when the ECU 16 displays the camera displays from the infrared camera 12 in a nominal tone until the obstacle is detected, reduces the tone of the display on the display device 18 if the obstacle is detected, and cancels the tone reduced status of the display device 18 to display the camera display from the infrared camera 12 in the nominal tone on the display device 18 if the obstacle on the road is not detected by the image recognition process on the camera image from the visible light camera 14.

According to the present embodiment, if the obstacle on the road is detected based on the camera image from the infrared camera 12, the illumination direction of the visible light from the front lighting device 20 is changed; the camera image from the infrared camera 12 is displayed in the tone reduced status on the display device 18; and then, if the obstacle on the road is not detected based on the camera image from the visible light camera 14 after having changed the illumination direction of the visible light from the front lighting device 20, the camera image from the infrared camera 12 is displayed on the display device 18, changing the tone reduced status to the tone down canceled status, and the position of the obstacle is featured in the display. In other words, if the obstacle on the road is detected based on the camera image from the infrared camera 12, the camera image from the infrared camera 12 is displayed in the tone reduced status on the display device 18, and then if the obstacle on the road is not detected based on the camera image from the visible light camera 14 after having changed the illumination direction of the visible light from the front lighting device 20, the tone reduced status on the display device 18 is canceled.

However, the present invention is not limited to this configuration. For example, when the obstacle on the road is detected based on the camera image from the infrared camera 12, it may be determined whether the obstacle on the road is detected based on the camera image from the visible light camera 14, and if the obstacle on the road is detected based on the camera image from the visible light camera 14, the camera image from the infrared camera 12 may be displayed on the display device 18, while if the obstacle on the road is not detected based on the camera image from the visible light camera 14, the camera image from the infrared camera 12 may be continued to be displayed on the display device 18 and the position of the obstacle may be featured in the display.

Further, according to the present embodiment, if the obstacle on the road is not detected based on the camera image from the infrared camera 12, the camera image from the infrared camera 12 is displayed on the display device 18, while if the obstacle on the road is detected based on the camera image from the infrared camera 12, the tone of the camera image from the infrared camera 12 displayed on the display device 18 is reduced, and then if the obstacle on the road is not detected based on the camera image from the visible light camera 14, the tone reduced status is canceled such that the camera image from the infrared camera 12 is displayed in the nominal tone on the display device 18.

However, the present invention is not limited to this configuration. For example, the tone immediately before the tone of the display of the camera image from the infrared camera 12 displayed on the display device 18 is reduced due to the fact that the obstacle on the road is detected based on the camera image from the infrared camera 12 may be different from the tone immediately after the tone is increased due to the fact that the obstacle on the road is not detected based on the camera image from the visible light camera 14. In this case, the tone immediately before the tone reduction corresponds to "a first tone" in claims, the reduced tone corresponds to "a second tone" in claims, and the tone immediately after the tone increase corresponds to "a third tone" in claim.

Further, in the present embodiment, if the obstacle on the road is detected based on the camera image from the infrared camera 12, the illumination direction of the visible light from the front lighting device 20 is changed with the adaptive front-lighting system 22 such that the obstacle on the road is included in the illumination region; however, the present invention is not limited to a configuration where the illumination direction of the visible light from the front lighting device 20 is changed whenever the condition described above is met. For example, when the preceding vehicle or the oncoming vehicle is detected, the change of the illumination direction of the visible light from the front lighting device 20 may be limited with a predetermined limitation value or prohibited, and if the obstacle on the road is detected based on the camera image from the infrared camera 12 but is not detected based on the camera image from the visible light camera 14, the camera image from the infrared camera 12 may be continued to be displayed on the display device 18 and the position of the obstacle may be featured in the display. According to such a variant, the illumination direction of the visible light from the front lighting device 20 can be changed while reducing the glare of the driver of the preceding vehicle or the oncoming vehicle.

Further, according to the present embodiment, the process routine in FIG. 2 is performed regardless of whether the obstacle on the road detected based on the camera image from the infrared camera 12 in step S100 is the same as the obstacle on the road detected based on the camera image from the visible light camera 14 in step S106; however, the present invention is not limited to this. For example, even if the obstacles on the road are detected based on the camera image from the visible light camera 14 in step S106 but the detected obstacles do not include the same obstacle as detected based on the camera image from the infrared camera 12, the process routine may go to step S108.

Further, according to the present embodiment, the process routine in FIG. 2 is performed regardless of the speed of the host vehicle and the relative position of the obstacle with respect to the host vehicle; however, the present invention is not limited to this. For example, when the speed of the host vehicle is greater than a predetermined speed or the obstacle exists within a predetermined distance from the host vehicle, the process of step S108 may be omitted after the negative determination of step S106 so as to encourage the driver of the host vehicle to visibly perceive the obstacle on the road with direct vision immediately because the time until the host vehicle reaches the obstacle is short.

Further, according to the present embodiment, the infrared camera 12 is installed to detect the obstacle on the road in front of the host vehicle, and if the obstacle on the road is not detected based on the camera image from the visible light camera 14 after changing the illumination direction of the visible light from the front lighting device 20, in order to provide the driver of the host vehicle with the information about the obstacle, the camera image from the infrared camera 12 is displayed and the image for featuring the position of the obstacle on the road included in the camera image is superimposed thereon. However, the present invention is not limited to this. For example, in order to detect the obstacle on the road in front of the host vehicle, a radar device such as a millimeter wave radar or a laser radar may be installed. In this case, in order to provide the driver of the host vehicle with the information about the obstacle, an alarm display or an alarm sound may be output based on the detection of the obstacle by the radar device.

The invention claimed is:

1. A vision support apparatus for a vehicle, comprising:
an electronic control unit (ECU) working as:
a first obstacle detecting part configured to detect an obstacle near the vehicle with a visible light image;
a second obstacle detecting part configured to detect the obstacle using an infrared light image;
a detection status determining part configured to determine whether it is difficult or impossible for the first obstacle detecting part to detect the obstacle because the obstacle itself or a scene around the obstacle is dark and a reflection of visible light on the obstacle is not sufficient;
an obstacle information providing part configured to display an image based on the infrared light image on a predetermined display device to provide a driver of the vehicle with information about the obstacle detected by the second obstacle detecting parts if it is determined by the detection status determining part that it is difficult or impossible for the first obstacle detecting part to detect the obstacle; and
an infrared light image controlling part configured to display the infrared light image in a second tone on the predetermined display device if the obstacle is detected by the second obstacle detecting part, the second tone being lower than a first tone in which the infrared light image is displayed if the obstacle is not detected by the second obstacle detecting part, and then display the infrared light image in a third tone on the predetermined display device if it is determined by the detection status determining part that it is difficult or impossible for the first obstacle detecting part to detect the obstacle under a situation where the obstacle is detected by the second obstacle detecting part, the third tone being higher than the second tone.

2. The vision support apparatus for the vehicle of claim 1, wherein the obstacle information providing part displays the image based on the infrared light image on the predetermined display device such that an image portion related to the obstacle detected by the second obstacle detecting part is featured in the infrared light image displayed on the predetermined display device, if it is determined by the detection status determining part that it is not difficult or impossible for the first obstacle detecting part to detect the obstacle.

3. The vision support apparatus for the vehicle of claim 1, wherein the visible light image used in the first obstacle detecting part and the infrared light image used in the second obstacle detecting part are captured in substantially the same direction from the vehicle.

4. The vision support apparatus for the vehicle of claim 1, further comprising the electronic control unit (ECU) working as:
light direction changing part configured to change an illumination direction of a vehicle-mounted lighting device such that the changed illumination direction includes a direction in which the obstacle exists, if the obstacle is detected by the second obstacle detecting part, wherein
the detection status determining part determines whether it is difficult or impossible for the first obstacle detecting part to detect the obstacle after the illumination direction has been changed by the light direction changing part, and
the obstacle information providing part displays the image based on the infrared light image on the predetermined display device to provide the driver of the vehicle with information about the obstacle detected by the second obstacle detecting part, if it is determined by the detection status determining part that it is difficult or impossible for the first obstacle detecting part to detect the obstacle after the illumination direction has been changed by the light direction changing part.

5. The vision support apparatus for the vehicle of claim 4, wherein the detection status determining part determines whether the obstacle is detected by the first obstacle detecting part after the illumination direction has been changed by the light direction changing part, and
the obstacle information providing part provides the driver of the vehicle with information about the obstacle detected by the second obstacle detecting part, if it is determined by the detection status determining part that the obstacle is not detected by the first obstacle detecting part after the illumination direction has been changed by the light direction changing part.

6. The vision support apparatus for the vehicle of claim 4, wherein if there is a preceding vehicle or an oncoming vehicle, the change of the illumination direction by the light direction changing part is limited or prohibited.

7. The vision support apparatus for the vehicle of claim 1, wherein the obstacle information providing part does not provide the driver of the vehicle with information about the obstacle detected by the second obstacle detecting part, if it is determined by the detection status determining part that it is not difficult or impossible for the first obstacle detecting part to detect the obstacle.

\* \* \* \* \*